(No Model.)
A. A. & L. A. APPERT.
PRESS FOR MOLDING GLASS.
No. 291,265. Patented Jan. 1, 1884.
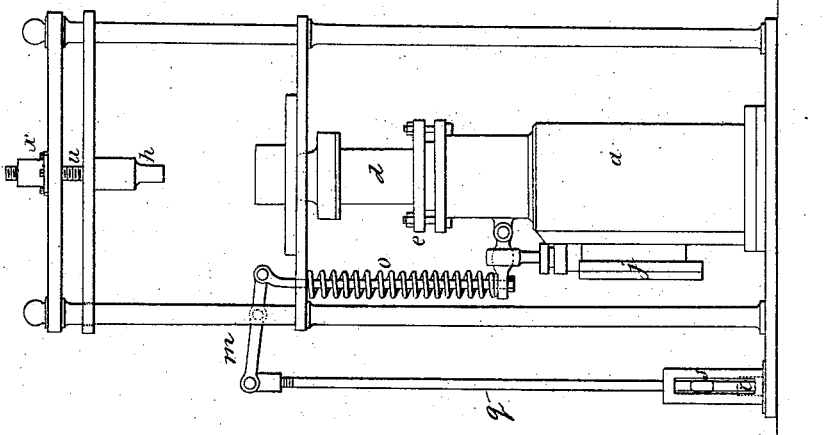
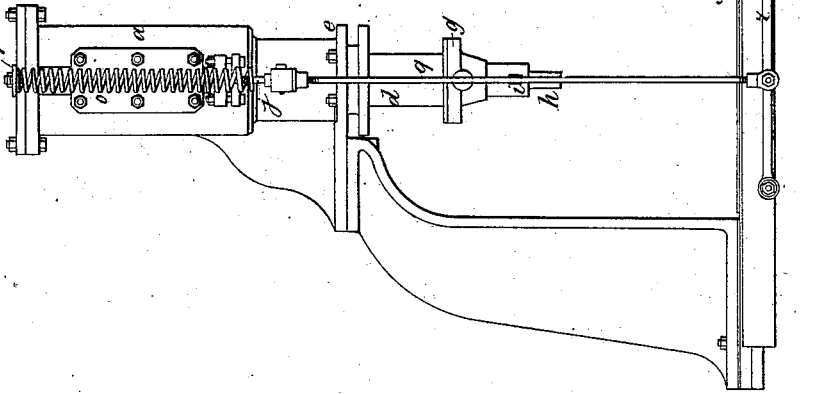
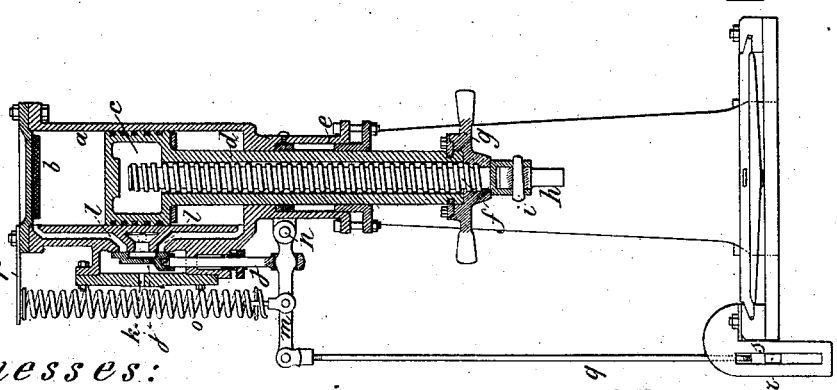

United States Patent Office.

ADRIEN ANTOINE APPERT AND LÉON ALFRED APPERT, OF PARIS, FRANCE.

PRESS FOR MOLDING GLASS.

SPECIFICATION forming part of Letters Patent No. 291,265, dated January 1, 1884.

Application filed October 13, 1883. (No model.)

*To all whom it may concern:*

Be it known that we, ADRIEN ANTOINE APPERT and LÉON ALFRED APPERT, of Paris, France, have invented a new and useful Press for Molding Glass, based upon the application of compressed air at a high temperature, or of any other fluid, elastic or not, of which the following is a full, clear, and exact description.

The invention forming the object of the present application for a patent relates to a system of press for molding glass, based upon the application of compressed air or of any other fluid, elastic or not, arranged in such a manner as to render its employ feasible for practical purposes.

The apparatus invented by us consists, essentially, of a cylinder in which moves an air-tight piston provided with segmental rings, or packed upon the upper and lower faces of which the compressed air, (or other fluid,) after having been brought to a proper pressure, acts alternatively. An arrangement analogous to that employed in steam-engines supplies the air at one time above and at one time below the piston. The movement of the slide-valve is produced by the glass-worker himself by means of a lever that he has under his hand, and which is rebrought to its original position by means of a retracting-spring. The ports of the slide-valve are beveled, in order that the descent of the piston may be effected as slowly as may be judged necessary by the workman. The piston-rod is composed of a hollow socket-piece in cast-iron, in which moves longitudinally a screw which can be raised or lowered by means of a nut, according to the height of the core of the piece to be molded; or the mold might be fixed immovably upon the piston-rod, and the core in this case would be arranged upon a cross-piece outside with regard to the mold, and its height regulated in the same manner by means of a screw or a nut. We therefore reserve to ourselves the right to produce the molding by rendering either the core or the mold movable and by placing the piston either above or below the mold. The socket-piece fixed to the piston works through a stuffing-box forming the joint and allowing it to move in a vertical line. This socket-piece might, besides, be directed by a guide moving upon vertical columns. The distribution of the motor-fluid may be effected by means of a cock, a valve, or slide-valve. We reserve to ourselves the right to employ any one of these means. The two ends of the cylinder are provided with thick india-rubber sheets, in order to deaden the shock at the end of each stroke.

We have said that any fluid might be employed for moving the piston. We, notwithstanding, prefer to employ compressed air on account of the inconveniences that would be incurred by employing steam or water in the case of leakage or condensation, whereas the compressed air, which produces no destructive action upon any of the parts or the molds, can, besides, be utilized for the cooling of the molds or other parts.

The advantages of our system of press are as follows: First, giving as strong a pressure as is wished for; second, acting very rapidly or very slowly and gradually, according as may be required; third, producing a regular pressure without shock; fourth, delivering the work more rapidly without fatigue for the glass-worker, and never necessitating the presence of more than one workman, whatever may be the pressure judged necessary and the size of the piece.

We have represented in the annexed drawings two variations of the same system of machine.

Figures 1 and 2 respectively represent a longitudinal section and side elevation of one arrangement, and Fig. 3 a side elevation of the other.

$a$ is a cylinder, lined at top and bottom with sheets of india-rubber, for deadening the shocks of the piston $c$. $d$ is a hollow socket-piece in cast-iron, fitted to the lower part of the piston, and answering the purpose of a piston-rod. $e$ is the stuffing-box for the hollow rod $d$; $f$, the screw that can be raised and lowered in the hollow rod $d$; $g$, a fixed nut serving to raise and lower the screw $f$. This last is provided with a keyway, which prevents it from turning in the socket-piece $d$. $h$ is the core, which is fixed to the end of the screw $f$ by means of a key, $i$. $j$ is the slide-valve; $k$, the opening for the admission of the compressed air into the slide-valve, and $l\ l$ the openings for the admission into the cylinder. $m$ is a lever, pivoted at $n$, and to which is attached the rod of the slide-valve $j$. A spring, $o$, is fixed at one end to the lever $m$, and at the other to a fixed piece, $p$. At the end of the lever $m$ is pivoted a lever, $q$, that the workman lowers by acting upon the lever $r$, and which retakes its position afterward in consequence of the action of the spring $o$, which, by the intermediary of the lever $m$, causes the slide-valve to remount, which then admits compressed air in below the piston in order to effect the withdrawal of the core. A guide, $s$, forces the lever $r$ to rest in a vertical plane during all the movements given it by the workman or by the spring $o$.

In the arrangement represented, Fig. 3, the mold is fixed to the end of the piston-rod, and the core $b$, exterior to the cylinder, is adjustable by means of a screw, $u$, which is made to rise or descend by means of a fixed nut, $x$. As regards the working, it is the same as in the type represented in Figs. 1 and 2—that is to say, that the slide-valve is always worked by the lever $r$ and the retracting-spring $o$. The principle, therefore, of the machine is not changed.

The operation is as follows: The air is admitted alternately at each end of the cylinder, and the piston moved back and forth, carrying with it the core or mold, as the case may be, the slide-valve controlling the admission of air being moved in one direction by the lever $r$ by the operator, and in the other by the recoil of the spring $o$.

We claim—

1. In a press for molding glass, the combination, with an air-cylinder and its piston carrying a core or mold, of a valve for controlling admission of air to the cylinder, operated by a lever for moving it in one direction, and by the recoil of a spring for moving it in the other, substantially as herein shown and described.

2. In a press for molding glass, the combination, with a motor-cylinder, of a slide-valve provided with a retracting-spring, the movements of which the workmen can control by hand, and an adjusting arrangement for regulating by hand the variable distance between the core and the mold, an arrangement that includes a screw-threaded rod, $f$, moving longitudinally in the socket-piece or hollow rod $d$ of the piston by means of a thumb-nut, $g$, that turns upon the end of the rod $d$, all substantially as above described, and represented in the annexed drawings, and for the purposes set forth.

3. In a press for molding glass, the combination, with an air-cylinder provided with ports $l$, and its piston carrying a core or mold, of the slide-valve $j$, the levers $m$ $r$, the connecting-rod $q$, and the spring $o$, secured to the lever $m$ and to a projection on the upper end of the cylinder, substantially as herein shown and described.

The foregoing specification of our system of press for molding glass, based upon the application of compressed air at a high temperature, or of any other fluid, elastic or not, signed by us this 13th day of September, 1883.

ADRIEN ANTOINE APPERT.
LÉON ALFRED APPERT.

Witnesses:
ROBT. M. HOOPER,
LEON PAUL AUGUSTE PRUGNIER.